US011491857B2

(12) United States Patent
Hendricks

(10) Patent No.: US 11,491,857 B2
(45) Date of Patent: Nov. 8, 2022

(54) METHOD AND APPARATUS FOR CONVERSION OF MOTORIZED VEHICLES TO ELECTRIC VEHICLES

(71) Applicant: Stephen P. Hendricks, Los Gatos, CA (US)

(72) Inventor: Stephen P. Hendricks, Los Gatos, CA (US)

(73) Assignee: Stephen P. Hendricks, Los Gatos, CA (US)

( * ) Notice: Subject to any disclaimer, the term of this patent is extended or adjusted under 35 U.S.C. 154(b) by 72 days.

(21) Appl. No.: 17/120,153

(22) Filed: Dec. 12, 2020

(65) Prior Publication Data

US 2021/0178878 A1 Jun. 17, 2021

Related U.S. Application Data

(60) Provisional application No. 62/948,006, filed on Dec. 13, 2019.

(51) Int. Cl.
*B60K 1/00* (2006.01)

(52) U.S. Cl.
CPC .......... *B60K 1/00* (2013.01); *B60Y 2304/076* (2013.01); *B60Y 2304/078* (2013.01)

(58) Field of Classification Search
CPC ....................................... B60K 1/00
See application file for complete search history.

(56) References Cited

U.S. PATENT DOCUMENTS

| 4,216,839 | A | * | 8/1980 | Gould | .................. B60L 53/80 |
| | | | | | 267/221 |
| 7,588,117 | B2 | * | 9/2009 | Fukuda | ................ B62D 21/155 |
| | | | | | 180/291 |
| 8,596,403 | B2 | * | 12/2013 | Cunningham | ........... B60K 1/00 |
| | | | | | 180/300 |

(Continued)

*Primary Examiner* — Erez Gurari
(74) *Attorney, Agent, or Firm* — Nicholson De Vos Webster & Elliott LLP

(57) ABSTRACT

Apparatus and method for converting a gas-powered vehicle to an electric vehicle. For example, one embodiment of an apparatus comprises: a motor case comprising: an inner surface forming a central cavity with a volume sufficient to enclose a first type of electric motor, the volume of the central cavity formed, at least in part, based on dimensions of a crankshaft of a gas-powered engine to be replaced by an electric motor; an outer surface coupled to the inner surface through a material layer comprising a material from which the motor case is fabricated; a plurality of internal connection elements to fixedly couple the motor within the motor case; and a set of external connection elements coupled to or formed on the outer surface of the motor case, the set of external connection elements arranged in accordance with connection points of a vehicle chassis, the set of external connection elements to be used to couple the motor case to the chassis at the connection points and to couple various gas-powered engine accessories. In one implementation, a second set of external connection elements are used to connect accessories, including accessories which are in combination with the electric motor and accessories which are not used, but which are coupled to the motor case for aesthetic purposes.

19 Claims, 15 Drawing Sheets

(56) References Cited

U.S. PATENT DOCUMENTS

| | | | |
|---|---|---|---|
| 8,839,899 B2* | 9/2014 | Kim | B60K 5/1216 |
| | | | 180/300 |
| 9,102,221 B1* | 8/2015 | Monfort | B60K 1/00 |
| 9,859,835 B2* | 1/2018 | Click | H02K 7/006 |
| 10,358,024 B2* | 7/2019 | Yugami | B60K 1/04 |
| 2004/0237517 A1* | 12/2004 | Cho | B60L 50/51 |
| | | | 903/902 |
| 2005/0079068 A1* | 4/2005 | Shigematsu | B60K 5/1216 |
| | | | 417/423.15 |
| 2011/0031051 A1* | 2/2011 | George | B60L 50/16 |
| | | | 29/596 |
| 2011/0083309 A1* | 4/2011 | Kshatriya | B60W 20/00 |
| | | | 903/903 |
| 2012/0055724 A1* | 3/2012 | Iwasa | B60L 53/11 |
| | | | 180/68.5 |
| 2014/0262567 A1* | 9/2014 | Kedzierski | B60L 50/66 |
| | | | 180/65.1 |
| 2018/0022387 A1* | 1/2018 | Ta | B60L 50/66 |
| | | | 180/291 |
| 2019/0372426 A1* | 12/2019 | Van Gelder | B60T 13/586 |
| 2021/0129915 A1* | 5/2021 | Timofeev | B62D 25/12 |
| 2021/0178878 A1* | 6/2021 | Hendricks | B60K 1/00 |

* cited by examiner

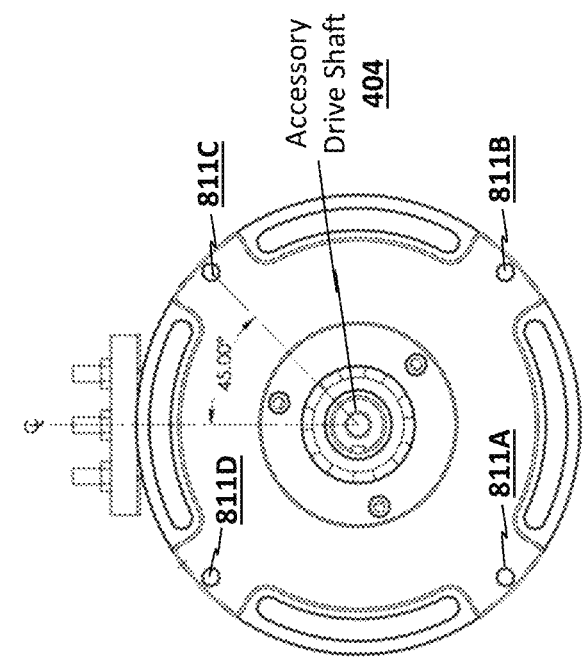
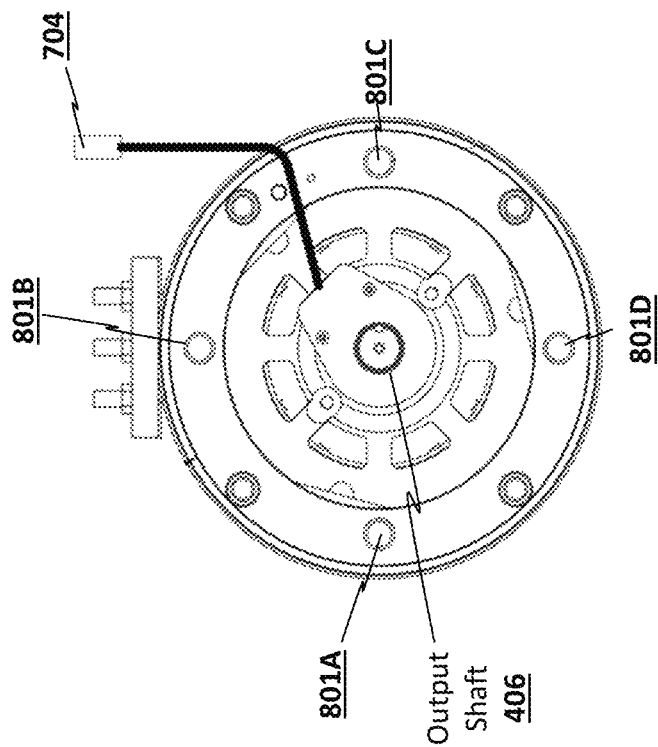
FIG. 8A
FIG. 8B

METHOD AND APPARATUS FOR CONVERSION OF MOTORIZED VEHICLES TO ELECTRIC VEHICLES

CROSS REFERENCE TO RELATED APPLICATION

This application claims the benefit of U.S. Provisional Patent Application Ser. No. 62/948,006, filed on Dec. 13, 2019, all of which is herein incorporated by reference.

BACKGROUND

Field of the Invention

The present disclosure is generally related to the conversion of gasoline-powered vehicles to electricity-powered vehicles and more particularly related to a method of and device for easy replacement of gasoline powered engines with electric motors.

DESCRIPTION OF THE RELATED ART

The age of electric vehicles has arrived. Companies, such as Tesla, have laid the ground work needed to make electric vehicles a viable transportation option for the average consumer. Every major automobile manufacturer that historically produced only internal combustion-powered cars will soon offer a type of electric car. Electric vehicles are becoming popular with the general consumer for many reasons. First, electric cars are easier on the environment than gasoline-powered cars because they produce very little pollution. If the battery used to power the motor is charged using clean energy, then electric cars create almost no pollution. Second, gasoline is a limited resource. The United States produces far less gasoline than is necessary to keep the country functioning. The domestic oil deficit is made up by importation of oil from other countries. Reliance on foreign oil is a risk to our economy and to our national security. For these reasons and more, some politicians have started to propose the elimination of gasoline-powered cars within the next one to two decades.

As the market for electric automobiles expands, the general consumer is faced with a few tough decisions. As mode and more consumers transition to electric cars, some gasoline-powered cars may end up in salvage yards waiting to be crushed. There may be consumers who desire electric cars, but cannot afford or do not wish to pay a premium for a new electric vehicle. There may be consumers who desire the advantages of electric cars but loathe giving up their vehicle for other reasons such as personal attachment. For example, there is a large segment of consumers who enjoy collecting certain classic cars for their appearance and aesthetic appeal.

There is also a large market of consumers who modify classic cars or collect these modified classic cars known as "hot rods." A conservative estimate of retail sales in restoration and custom parts for the classic car and hot rod market was several billion in 2016. For that same year, the Specialty Equipment Market Association (SEMA) reported that the hot rod and classic car market segment was a significant component of the $36 billion automobile specialty equipment industry. For hot rod consumers and other consumers who have reasons to keep the body and chassis of the original cars but still desire the benefits of an electric car, a solution to easily convert the gasoline-powered car to electric is desired.

However, contemporary conversions are not easy or feasible monetarily or structurally. Contemporary methods of conversions are prohibitively costly and are highly difficult if not impossible to execute depending on the type of car. Contemporary services to convert the engine may not even be offered for certain types of cars. For example, conversion services may not be offered or recommended for cars with automatic transmissions due to the extra hydraulic pump and inefficiency of torque converters as compared to manual transmissions. For those specialized mechanics shops that specialize in conversions, the price may be prohibitively costly. Furthermore, the components required for conversion may be innumerous. Depending on various factors such as the performance level of the electric motor, the capacity, and type of battery pack chosen, the parts alone for such conversions may cost a hefty fee. For example, parts alone may easily cost $10,000 to $25,000 USD because engineering and fabrication of special one-off parts may be required. The cost to have a reputable shop do the conversion may be as much as $100,000 USD on average, which may not be affordable to the mass consumer.

Furthermore, engineering and designing the electric drive system for a particular car model may require extensive expertise. Unique motor adaptors, motor mounts, coupling flanges, and many other parts may need to be designed and fabricated for each unique application. The designer and mechanic of the conversion must carefully consider the use of numerous options for the various components that are required to do a conversion, as well as have a basic understanding of electrical engineering in order to execute the design. Some example key considerations include whether to use AC or DC power to drive the motor, which motor controller will be used, how much voltage is optimal for a specific electric motor, what type of battery pack will be used, whether an inverter is required, what cables and other wirings are required, whether the existing electrical car system will be compatible with the new electric motor, etc. These and other options must be carefully considered because all the components must be compatible and fit within the confines of the body of the automobile undergoing the conversion.

The problems of contemporary conversions are compounded by further factors. For example, most gasoline-powered automobiles run accessories like power steering, air conditioning and alternators. These accessories are powered by a pulley and belt system that is typically mounted to the front of the motor and driven by the rotation of the motor's crankshaft. Contemporary conversions require the purchase and installation of additional pumps to enable the power steering and air conditioning, and separate voltage reducers to replace the alternator. The additional pumps and voltage reducers are powered by the battery pack. As a result, the range of the battery is further reduced. Furthermore, unique adaptors or mounting brackets will be necessary to adapt these additional pumps or other components to the automobile.

As such, contemporary methods of conversions are time-consuming, costly, difficult to implement without extensive expertise, and results in reducing the benefits of electric motors. This present disclosure is related to systems and methods of converting a gasoline engine to an electric motor via a direct replacement that is easy, affordable and preserves the look and function of the original engine.

BRIEF DESCRIPTION OF THE DRAWINGS

A better understanding of the present invention can be obtained from the following detailed description in conjunction with the following drawings, in which:

FIGS. 7 and 8A-B illustrate one embodiment of an electric motor;

DETAILED DESCRIPTION

The embodiments of the present disclosure include systems and methods for converting a gasoline engine to an electric motor via a direct replacement that is easy, affordable and preserves the look of the original engine. In one embodiment, the replacement electric motor is of similar size and installs right into the same location using the original mounting system as the original gasoline motor. In one embodiment, a motor case is specifically designed to house the electric motor. The motor case is fabricated based on the crankcase of an existing vehicle and includes the same connection points to couple the motor case to the chassis of the vehicle, while at the same time providing the correct orientation for the electric motor to integrate with the vehicle's existing transmission and front accessory pulley system. In this embodiment, there may be no need for adaptors or mounts to be separately fabricated because the replacement electric motor will utilize the same motor mounts and will bolt directly to the transmission as the original gasoline motor does.

Furthermore, the electric motor will have the same bolt pattern and configuration as the gasoline motor, which will allow attachment of the original accessories.

In this embodiment, modification of the chassis, motor mount brackets, clutch, transmission or other parts of the automobile may not be needed. Existing accessories that were powered by the rotation of the gasoline-powered motor may remain unchanged and functional. The existing electrical system that powers the original lights, window wipers, radio, power windows, etc. may remain unchanged and fully functional. In an embodiment, the electric motor may be a plug-and-play motor that may be easily plugged into and unplugged from the car. For example, the automobile may be easily converted back to gasoline-powered engine just by removing the electric motor and plugging the original engine back in. The embodiment would have no structural changes or major modifications during the conversion to electric power.

In an embodiment, the electric motor, which is housed within the motor case, may be a direct replacement of the original gasoline motor where the length and diameter of the electric motor and motor case must sit within the confines of the volume formed by the dimensions of the original gasoline motor. Furthermore, the motor mounts, bell housing and front accessory mount positions, and bolt patterns must match those of the original gasoline motor.

Figure 1:
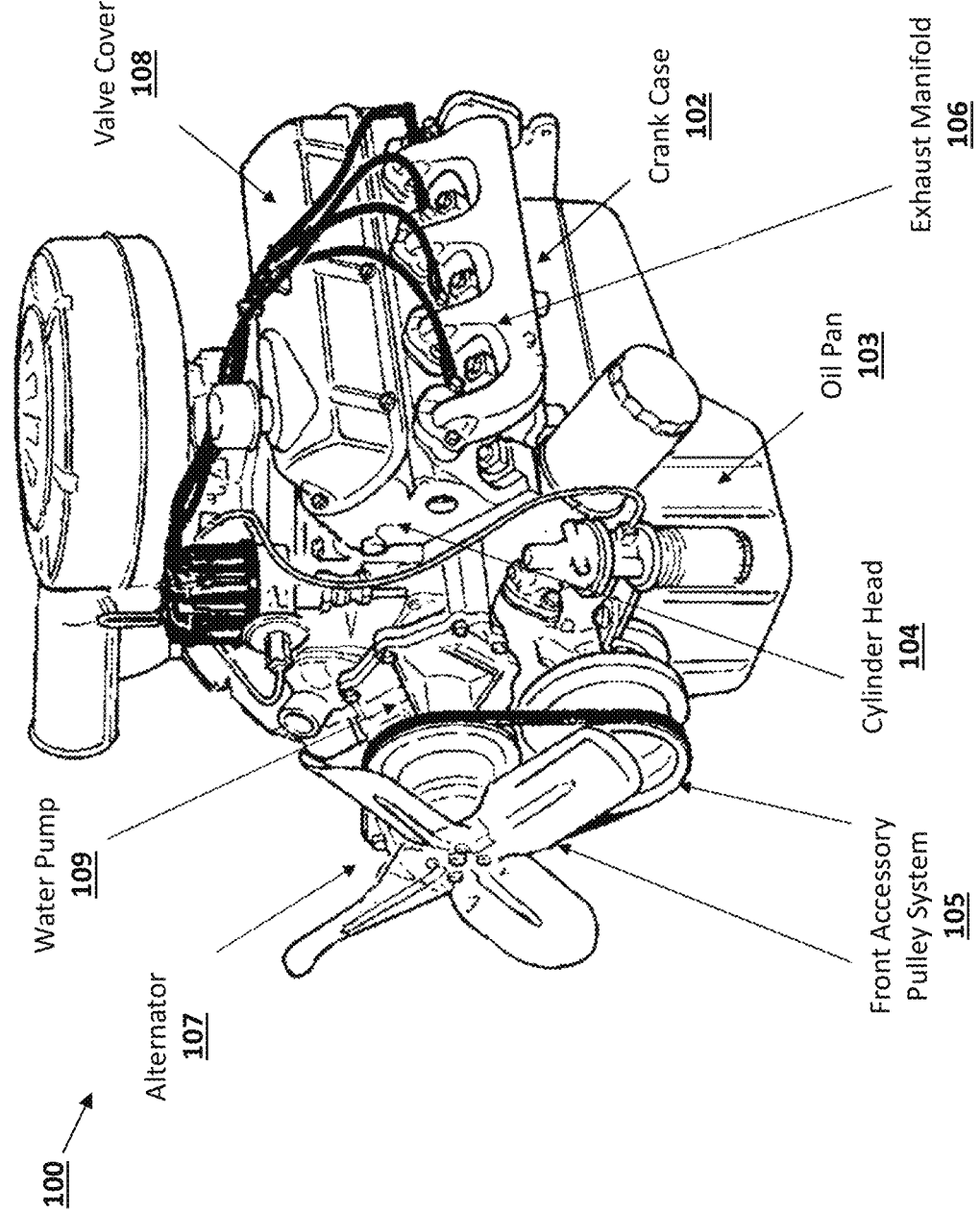
FIG. 1 illustrates an exemplary contemporary gasoline-powered engine.

FIG. 1 illustrates an exemplary contemporary internal combustion motor 100 that may be used to clarify the methods and systems of the electrical conversion process described herein. The highlighted components include a crank case 102, oil pan 103, cylinder head 104, front accessory pulley system 105, exhaust manifold 106, alternator 107, valve cover 108, and water pump 109. All contemporary gasoline-powered engines contain an engine house known as a "crankcase" 102. The terms "engine house," "engine block," and "crankcase" are used interchangeably. The crankcase 102 houses the crankshaft, pistons and cylinders (not shown) of the gas-powered engine.

Figure 2:
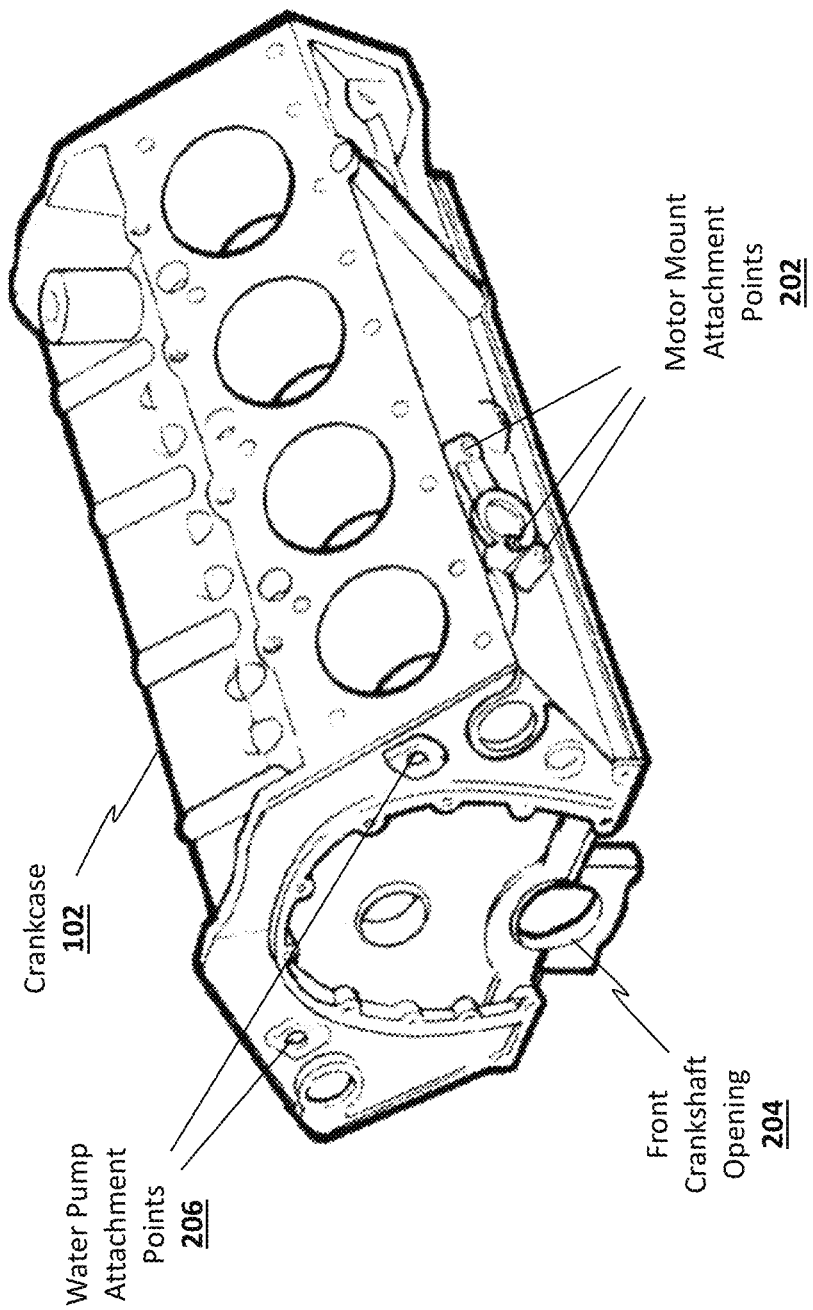
FIG. 2 illustrates an exemplary crankcase of a contemporary gasoline-powered engine.

FIG. 2 illustrates an exemplary crankcase 102 of a contemporary gasoline-powered engine 100. When all of the removable parts of a contemporary gas engine are stripped away, what is left is the engine block or crankcase 102. As indicated in FIG. 2, the crankcase 102 includes various openings and attachment points including a set of motor mount attachment points 202 for connecting the crankcase 102 to the vehicle, a front crankshaft opening 204 for exposing the crankshaft, and water pump attachment points 206 to engage with a water pump.

In one embodiment of the invention, an enclosure to house and attach an electric motor, referred to herein as the "motor case", is fabricated based on the front, rear, bottom, top, and side faces of the crankcase 102. For example, the shape, dimensions, and attachment points (e.g., bolt holes and other connection elements) of the crankcase may be used as a template for constructing the motor case to provide a seamless and potentially undetectable conversion from gas to electric power.

Figure 3:
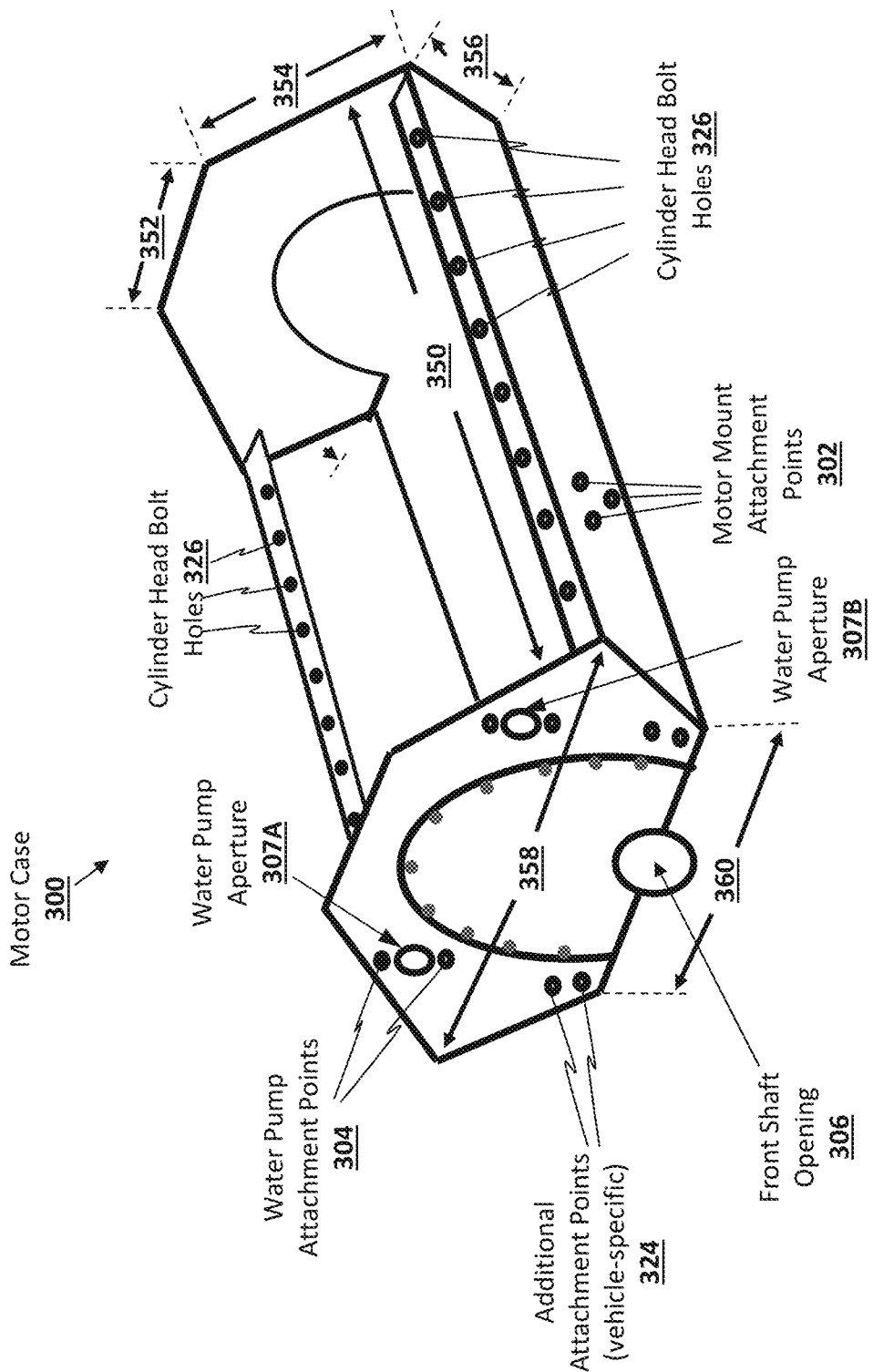
FIG. 3 illustrates an exemplary motor case in which a system for installation of an electric motor may be implemented.

FIG. 3 illustrates an exemplary motor case 300 for housing and connecting an electric motor to a gas powered vehicle. As mentioned, the dimensions and connection points of the motor case 300 are based on the crankcase 102 specific to the vehicle. In one embodiment, metal casting and/or forming techniques are used to manufacture the motor case 300 in accordance with the dimensions, apertures, and other relevant components of the crankcase 102. For example the motor case 300 may have the same overall external configuration, bolt patterns, accessory mounting positions, motor mounting configuration, and shape as the exterior of the original motor crankcase 102.

The motor case 300 may be fabricated from different metals and other materials. By way of example, and not limitation, the motor case 300 may be manufactured from aluminum, aluminum alloys, or cast iron. Cast iron is used for most engine blocks and is used for a current implementation of the motor case 300. However, various other metals, organic polymers (plastics), or other materials (e.g., carbon fiber) may also be used.

In the example shown in FIG. 3, the dimensions of the motor case 300 are specific to a Chevrolet small block V8 engine. Thus, the outside surface features and overall dimensions of the motor case 300 are the same as the stock Chevrolet small block engine block crankcase 102. Each face of the motor case 300 has the same or similar pattern and location of bolt holes as the original engine block, providing for attachment to the vehicle chassis as well as external parts and accessories (even if not used with an electric motor).

In one embodiment, the motor case 300 has the following dimensions (referring to the numbers shown in FIG. 3):

Distance 350=21.75 Inches
Distance 352=6 Inches
Distance 354=7.74 Inches
Distance 356=5.75 Inches
Distance 358=17 Inches
Distance 360=9.5 Inches It should be noted, however, that these specific dimensions are specific to one particular engine (a Chevy small block V8) and are not required for complying with the underlying principles of the invention.

The motor case 300 is the link between the electric motor and all of the original motor-related mechanical systems of the vehicle, thus enabling the plug-and-play conversion. The motor case 300 provides various functions related to the electric motor and other components. Internally, the motor case 300 supports the electric motor and holds it in position so that the front shaft and rear flange of the motor are in the same position as the corresponding ends of the crankshaft in the original engine. This enables the front and rear shafts of the electric motor to essentially replace the function of the crankshaft ends; they attach to the original components just as the crankshaft did. The motor case 300 allows all of the original accessories, such as the water pump in front, via the water pump attachment points 304, and the transmission bell housing in the rear, to bolt to the motor case in the same position as with the original motor.

In one embodiment, the motor case 300 is formed with the same arrangement of motor mount attachment points 302 used to attach the crankcase 102 to the automobile chassis. In addition, in certain embodiments described below, the motor case 300 provides attachment points for the cylinder heads, exhaust manifold, and other accessories that are only necessary to provide the appearance of a gas-powered engine.

The motor case 300 mounts the electric motor in the appropriate position so when the motor is running, it will rotate and power the car just as the crankshaft 102 did in the original gasoline engine. In one embodiment, the motor case 300 includes a central cavity that houses the electric motor and acts as an adaptor or connector that bolts the electric motor into the vehicle using the original motor mounts (via motor mount attachment points 302) and enables attachment of all of the original automotive components, including the transmission. The motor mount attachment points 302 of the motor case 300 provide holes for bolts to attach directly into the existing chassis motor mount brackets.

Internally, the motor case 300 is very different from the original crankcase 102. The original crankcase (see FIG. 2) contains the cylinders (4 round holes that run the length of the crankcase 102) that house the pistons, the main bearings that support the crankshaft (only the front bearing is visible in the bottom left front of the figure), the bearing supports for the camshaft (not shown) and various other components like water cooling jackets and oil galleries. The internal structure of the electric motor case 300 contains attachment points at the front and rear of the motor case that are used to support the electric motor housed within.

Figure 4:
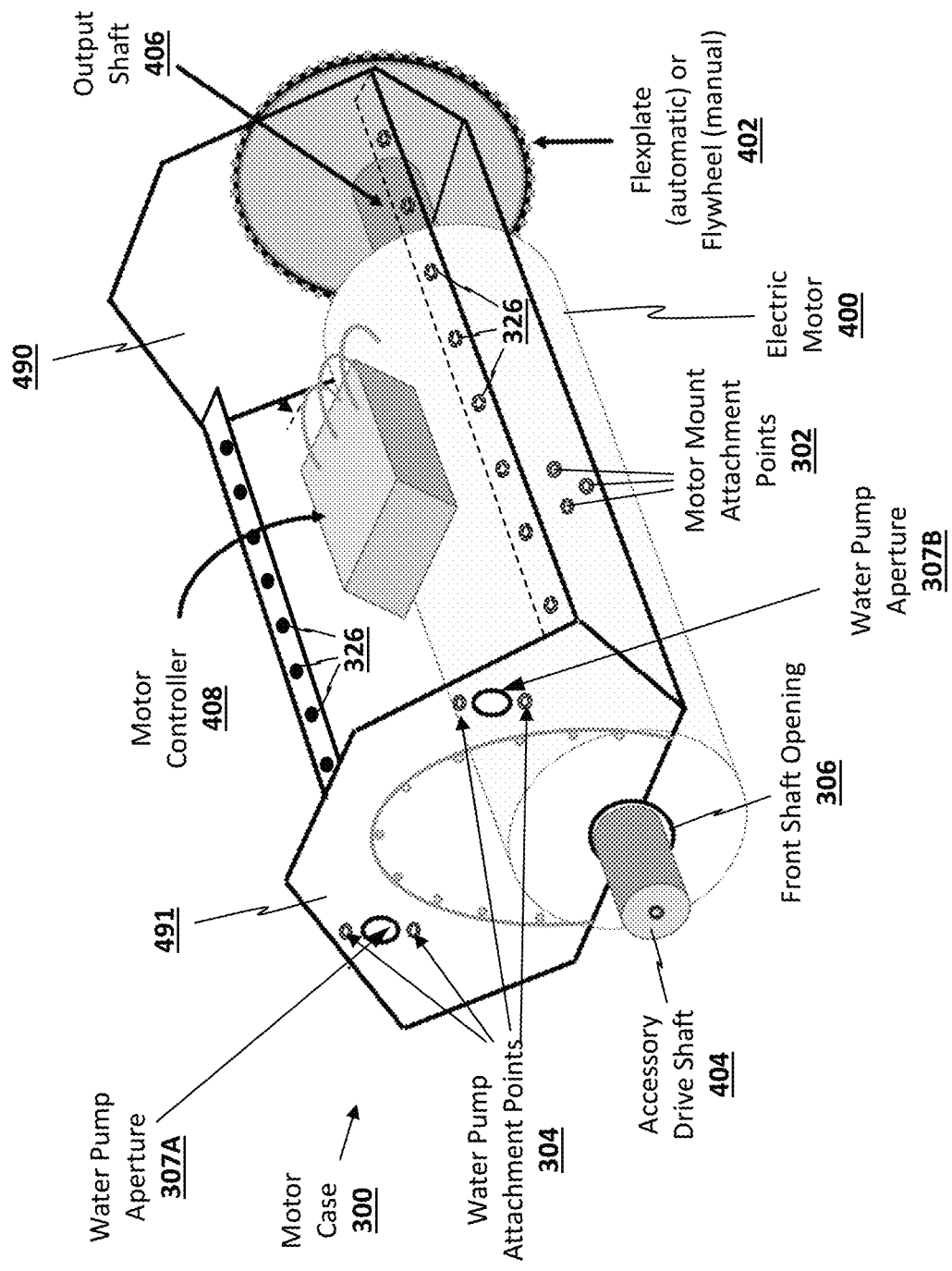
FIG. 4 illustrates an exemplary electric motor housed within an exemplary motor case.

FIG. 4 illustrates an exemplary electric motor 400 housed within the exemplary motor case 300. In an embodiment, the motor case 300 has the same basic dimensions and bolt patterns as the original crankcase 102. The output shaft 406 and accessory drive shaft 404 of the electric motor 400 are positioned and extended as needed so that they connect to the original parts and accessories in the same manner (e.g., using the same mechanical interconnects) as the original crankshaft. In particular, the front accessory drive shaft 404 of the electric motor 400 bolts to the original front pulley system of the vehicle which drives all of the front accessories such as the alternator, water pump, air conditioning pump and power steering pump.

Figure 5:
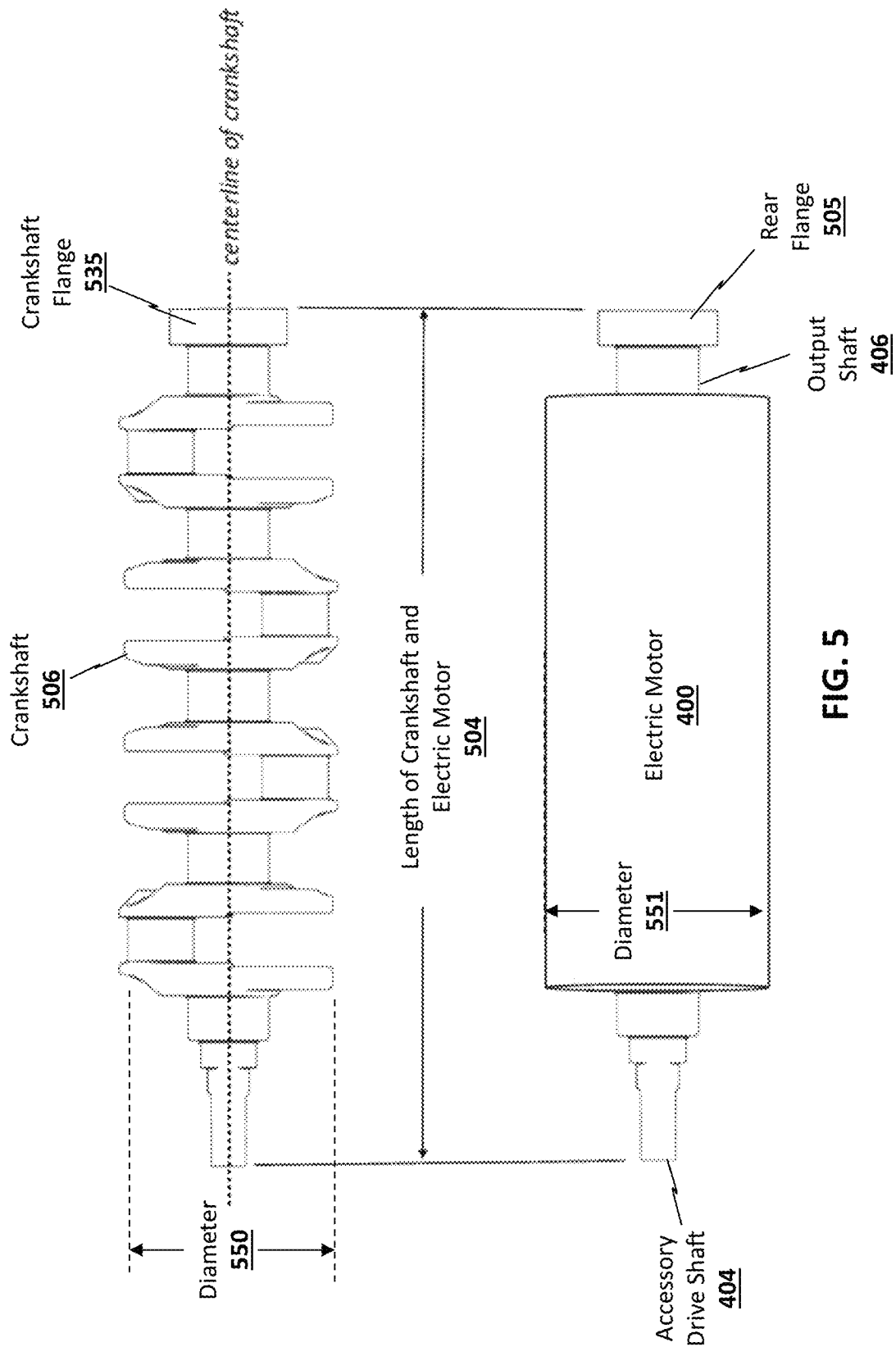
FIG. 5 illustrates a size and functional comparison between a crankshaft and an electric motor.

As illustrated in FIG. 5, a rear output flange 505 is coupled to the output shaft 406 of the electric motor 400 and is formed to operate in the same manner as the flange 535 of the crankshaft 506 of the original gas motor. In particular, the output flange 505 is designed to bolt to the original flexplate (automatic transmission) or flywheel (manual transmission) 402 using the same mechanical interconnects as the original crankshaft.

In one embodiment, the rear side 490 of the motor case 300 bolts directly to the existing bell housing (e.g., see, e.g., 900 in FIG. 9A), coupling it to the vehicle's transmission. The rear flange 505 coupled to the rear output shaft 406 of the electric motor 400 has the same dimensions, bolt pattern, and interconnect elements as the output flange 535 of the original crankshaft 506, as also illustrated in FIG. 5 for comparison. This enables utilization of the original transmission, drive shaft and rear differential to transfer the rotation of the electric motor to rotation of the rear tires. The added mechanical advantage that results from utilization of the transmission gearing yields more flexibility and usability from the electric motor 400.

The front face 491 of the motor case 300 includes bolt holes and other interconnection elements organized in the same pattern as the original crankcase 102. For example, FIGS. 3-4 show water pump attachment points 304 and corresponding water pump apertures 307A-B where the original water pumps were attached to the crankcase 102. The attachment points 304 comprise bolt holes to fixedly attach the water pumps through the water pump apertures 307A-B. In operation, one aperture 307A may be used for water intake and the other aperture 307B for outgoing water. Similar apertures and attachment elements are provided for various other accessories such as power steering pump, air conditioning pump, water pump, and alternator, allowing these devices to be attached in the same way as they were attached to the gasoline-powered engine.

Thus, the water (or other type of coolant) will enter and exit the motor case 404 in the same way as it did in the original motor. The water cooling system will operate such that it will be directed to the motor 400 and/or motor controller 408 or other parts of the electric drive system that may require cooling. Although not shown in FIG. 4, in one embodiment, the underside of the electric motor 400 is protected by the original oil pan or similar device.

A shaft opening 306 in the front 491 of the motor case 300 enables the accessory drive shaft 404 to protrude out from the inside of the motor case 300 and engage with the existing vehicle pulley system, thereby operating the power steering pump, air conditioning pump, alternator, water pump, and other vehicle accessories. In one embodiment, the accessory drive shaft 404 has the same dimensions and attachment mechanisms as the front end of the gas-powered motor crankshaft.

In one embodiment, a set of 16 cylinder head bolt holes 326 (8 on each side of the motor case 300) are included to enable re-attachment of the cylinder head or portions thereof, to provide the look and feel of the original gas engine. In one embodiment, these bolt holes 326 are used to reattach the stock cylinder heads or a portion thereof (as described below with respect to FIGS. 12A-B).

Figure 6:
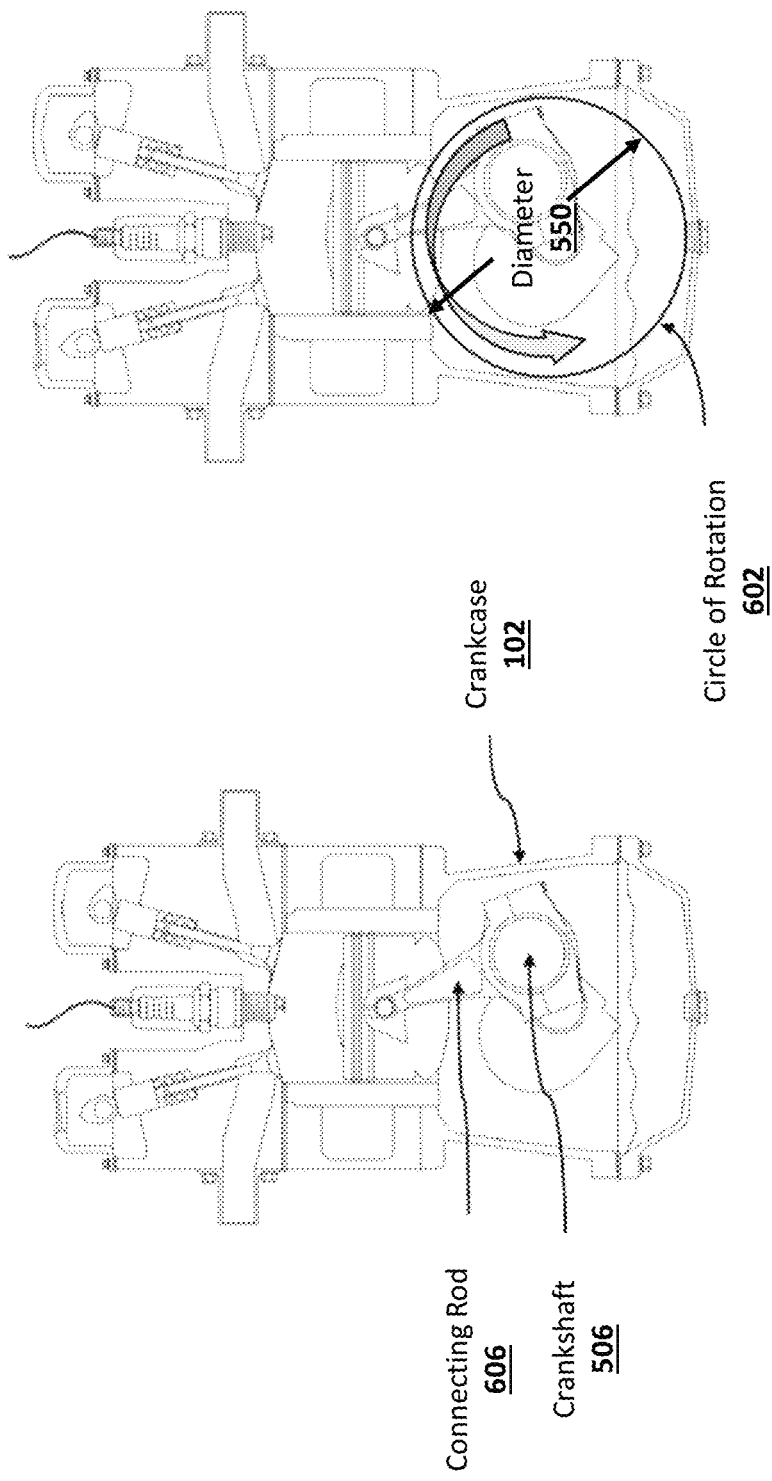
FIG. 6 illustrates aspects of a gas-powered motor.

Referring again to FIG. 5, In one embodiment, the maximum electric motor diameter 551 is equal to, or less than, the overall crankshaft diameter 550. FIG. 6 illustrates the diameter 550 as determined based on the circle of rotation 602 of the crankshaft 506 within the crankcase 102. This ensures that the electric motor will fit within the original motor mounts and other constraints defined by the vehicle's engine compartment as well as the confines of the original engine block and accessories that bolt to that block.

Constraining the electric motor to the same length 504 as the original crankshaft enables the direct attachment of the rear drive flange 505 of the electric motor to the transmission, and attachment of the front pulley to the electric motor, which drives the accessory functions like the power steering pump and the alternator. Using the same length as the original crankshaft ensures that these components can be connected to the electric motor 400 without modification. In one embodiment, the flange 505 fits the keyed output shaft 406 of the electric motor 400 and, as mentioned, has the same flange dimensions and bolt pattern as the flange 535 of the original crankshaft 506.

Figure 7:
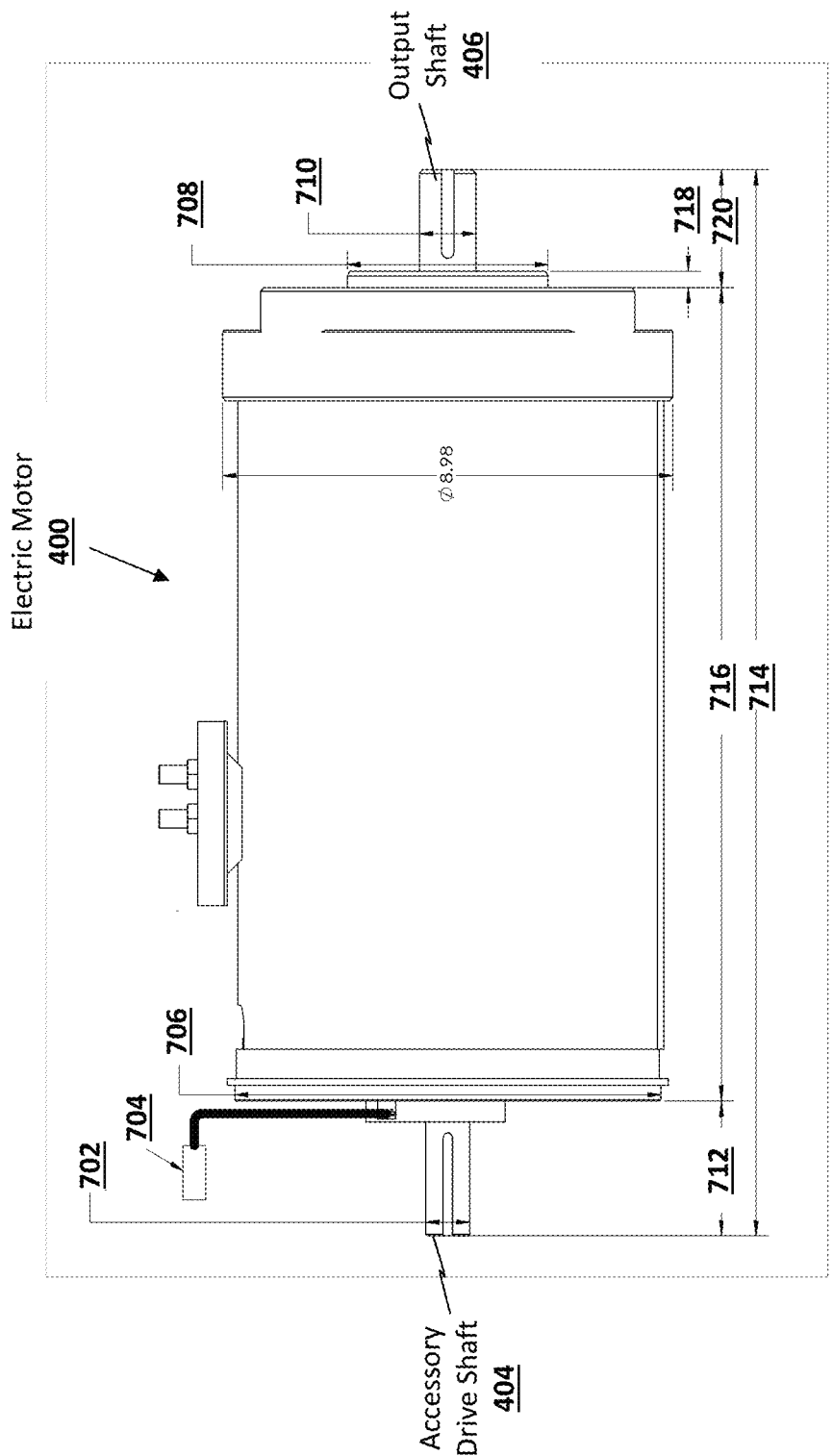

FIG. 7 illustrates a side view of an electric motor 400 used in a working embodiment of the invention. In this specific implementation, an AC50 Induction Drive motor is used, an 8" motor that is capable of producing 71 horsepower and 120 ft-lbs. Note, however, that the underlying principles of the invention are not limited to any specific type of electric motor.

The electric motor 400 has the following set of characteristics. The accessory drive shaft 404 has a 0.875 inch diameter 702 and the output shaft 406 has a 1.125 inch diameter 710. An encoder cable connector 704 connects the motor 400 to the motor controller 408. In one embodiment, a Curtis 144-volt controller is used; although the underlying principles of the invention are not limited to any particular controller type. In one embodiment, a battery subsystem is coupled via the motor controller 408 to provide a controlled source of power to the electric motor 400. A lithium ion battery pack is used in one embodiment. The battery pack may comprise an array of lithium ion batteries arranged to fit within the motor case 300 and/or outside of the motor case 300.

One embodiment of the motor controller 408 uses the voltage from the battery to produce alternating current (AC) output to the electric motor 400, although a DC output could also be used. In one embodiment, the motor controller 408 provides a voltage for charging the battery when connected to a power outlet. In addition, in one embodiment, a voltage is provided to the battery when the vehicle is in use but not relying on the battery for power. For example, a regenerative braking system may be used in which the motor recharges the battery when the vehicle is traveling downhill.

The illustrated embodiment includes the following dimensions:

Distance 708: 4 inches
Distance 718: 0.279 inches
Distance 720: 2 inches
Distance 716: 13.80 inches
Distance 714: 18.09 inches
Distance 712: 2.29 inches
Distance 706: 8.50 inches FIG. 8A illustrates the front face of the electric motor 400 and FIG. 8B illustrates the rear face of the electric motor 400. The front face includes a first set of mounting threads 801A-D and the rear face includes a second set of mounting threads 811A-D. In one embodiment, the motor case 300 includes integrated brackets with a symmetric set of holes through which bolts are inserted to engage with the threads 801A-D, 811A-D to secure the electric motor 400 to the motor case 300. In one embodiment, the brackets are separate devices coupled to internal bolt holes or other connection elements inside the motor case 300. In another embodiment, the motor case 300 is formed/manufactured with integrated components to connect to the front and back of the electric motor 400.

Figure 9:
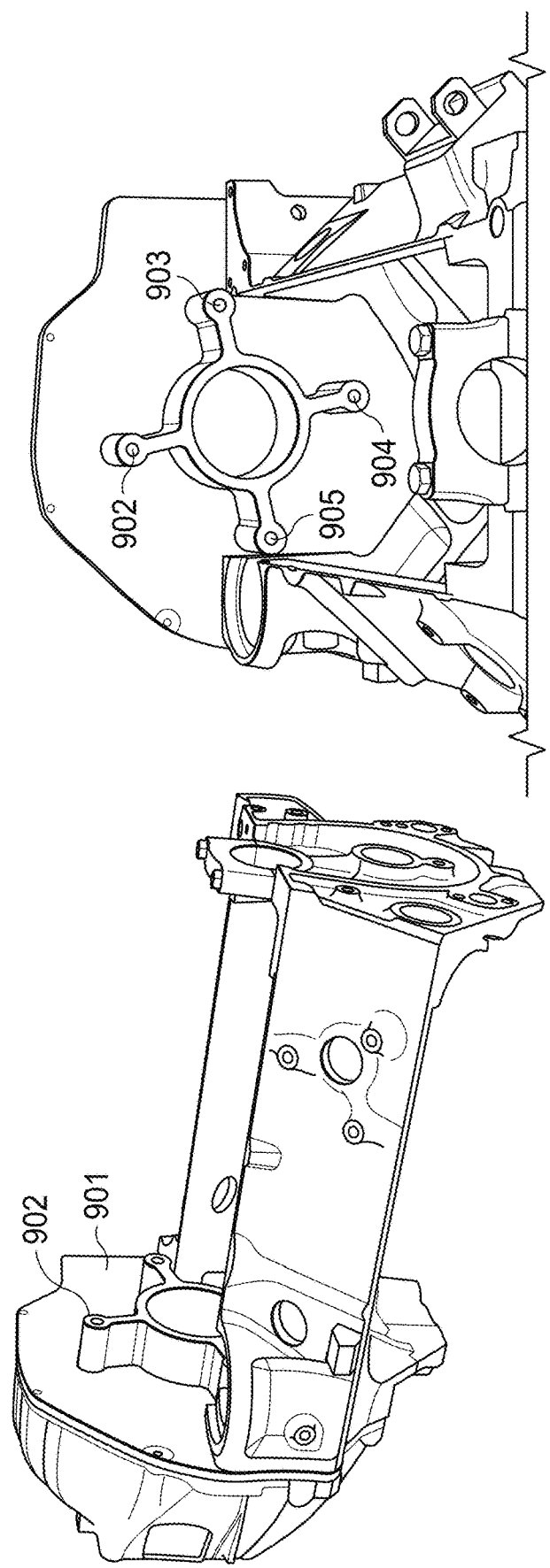
FIGS. 9A-B illustrate a motor case coupled to a bell housing via an adapter.

FIGS. 9A-B illustrate one embodiment of a rear adaptor plate 901 to support and connect the back end of the electric motor 400, with holes 902-905 corresponding to the threads 801A-D on the back end of the electric motor. In particular, the rear adaptor plate 901 couples to the bell housing 900 on one side and to the back end of the electric motor 400 via holes 902-905 and a set of bolts. The illustrated embodiment is specifically designed for a Chevrolet V8 engine and the mounting face of an AC50 electric motor 400 (described in greater detail below). In one embodiment, the adaptor plate 901 is sandwiched between the motor case 300 and the original bell housing 900 and is held in place by the original bell housing 900 bolts. As mentioned, in one embodiment, the rear adaptor plate 901 is formed as part of the motor case 300.

In the illustrated configuration, the rear of the electric motor 400 is coupled to the rear adapter plate 901 which is coupled to the motor case 300 and the bell housing 900. Consequently, the electric motor 400 is positioned correctly for utilization of the original transmission via the flange 505, which is passed through the aperture 906 in the rear adapter plate 901 to engage with the transmission within the bell housing 900.

Figure 10A:
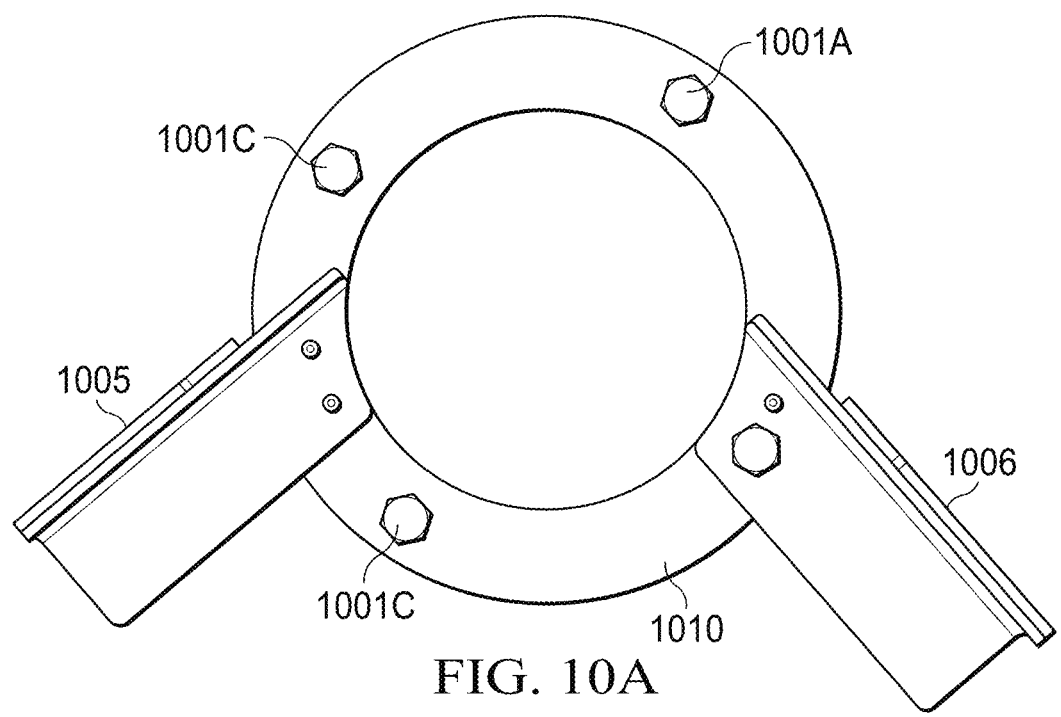
FIGS. 10A-B illustrate a motor mount assembly used in one embodiment.
Figure 10B:
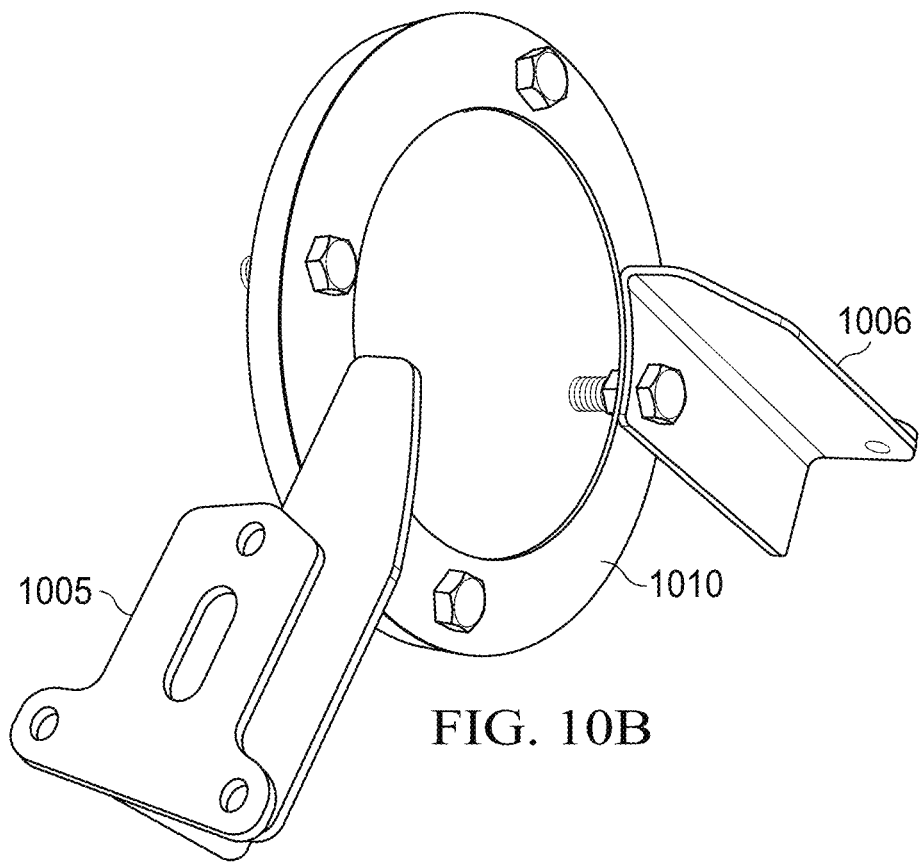

FIGS. 10A-B illustrate one embodiment of a front bracket assembly 1010 to support of the front of the motor 400 and couple the motor to the motor case 300. Holes 1001A-D in a circular portion of the bracket 1010 correspond to the threads 801A-D on the front of the electric motor 400. The holes are obscured by bolts in FIGS. 10A-B. Two support arms 1005-1006 extend outward from the circular portion to engage with the sides of the motor case 300. In one embodiment, the support arms 1005-1006 include holes corresponding to the three motor mount attachment holes 302.

The front bracket assembly 1010 may be fabricated from a mirror image pair of brackets created by attaching a flat steel plate forming the support arms 1005-1006 to a 6.25 inch length of steel angle bar. The flat steel plates contain 3 bolt holes arranged in a triangular pattern matching the bolt pattern 302 found on the motor case 300, which is the attachment point for the original motor mounts.

Figure 11A:
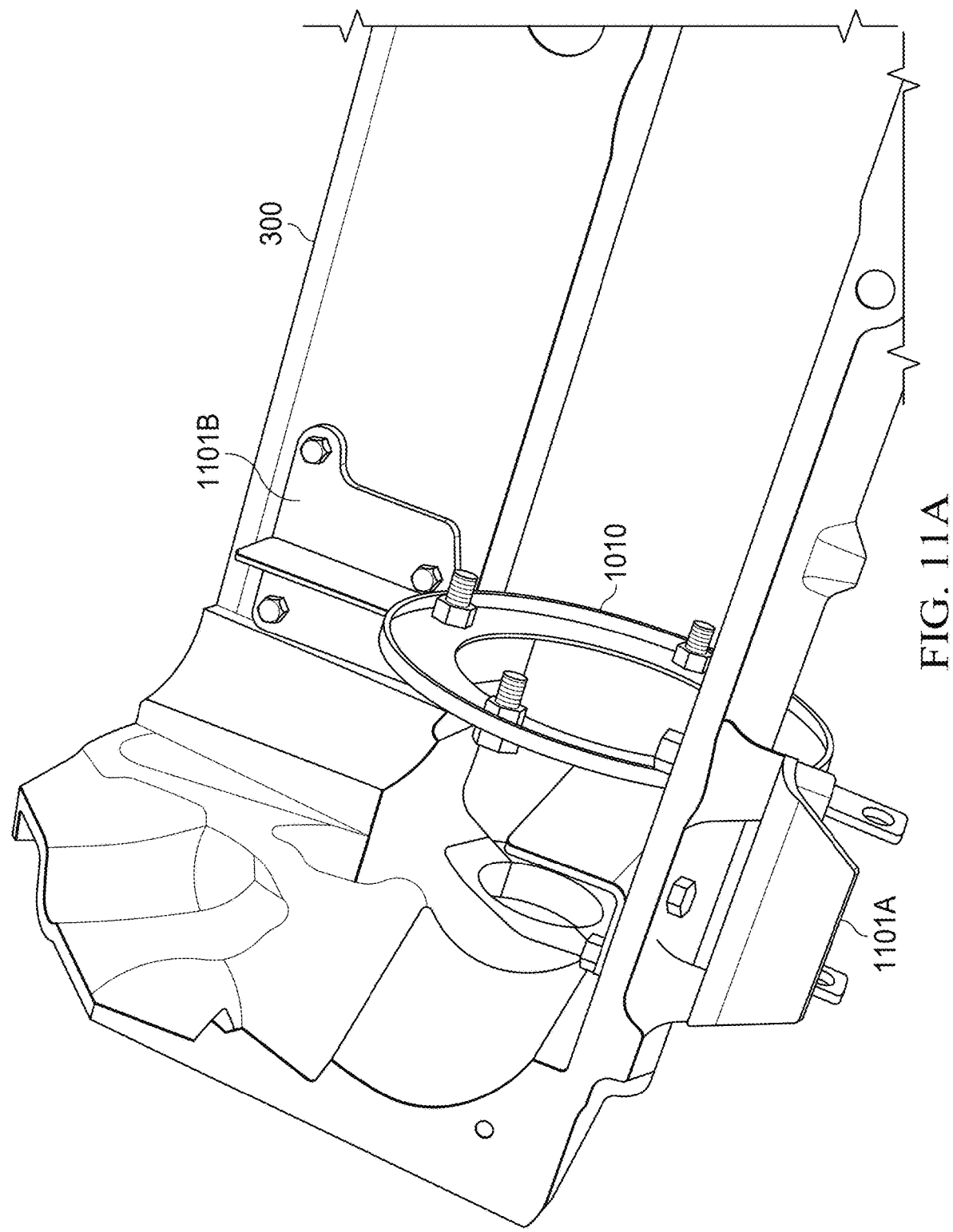
FIGS. 11A-B illustrate motor case attachment brackets in accordance with one embodiment.
Figure 11B:
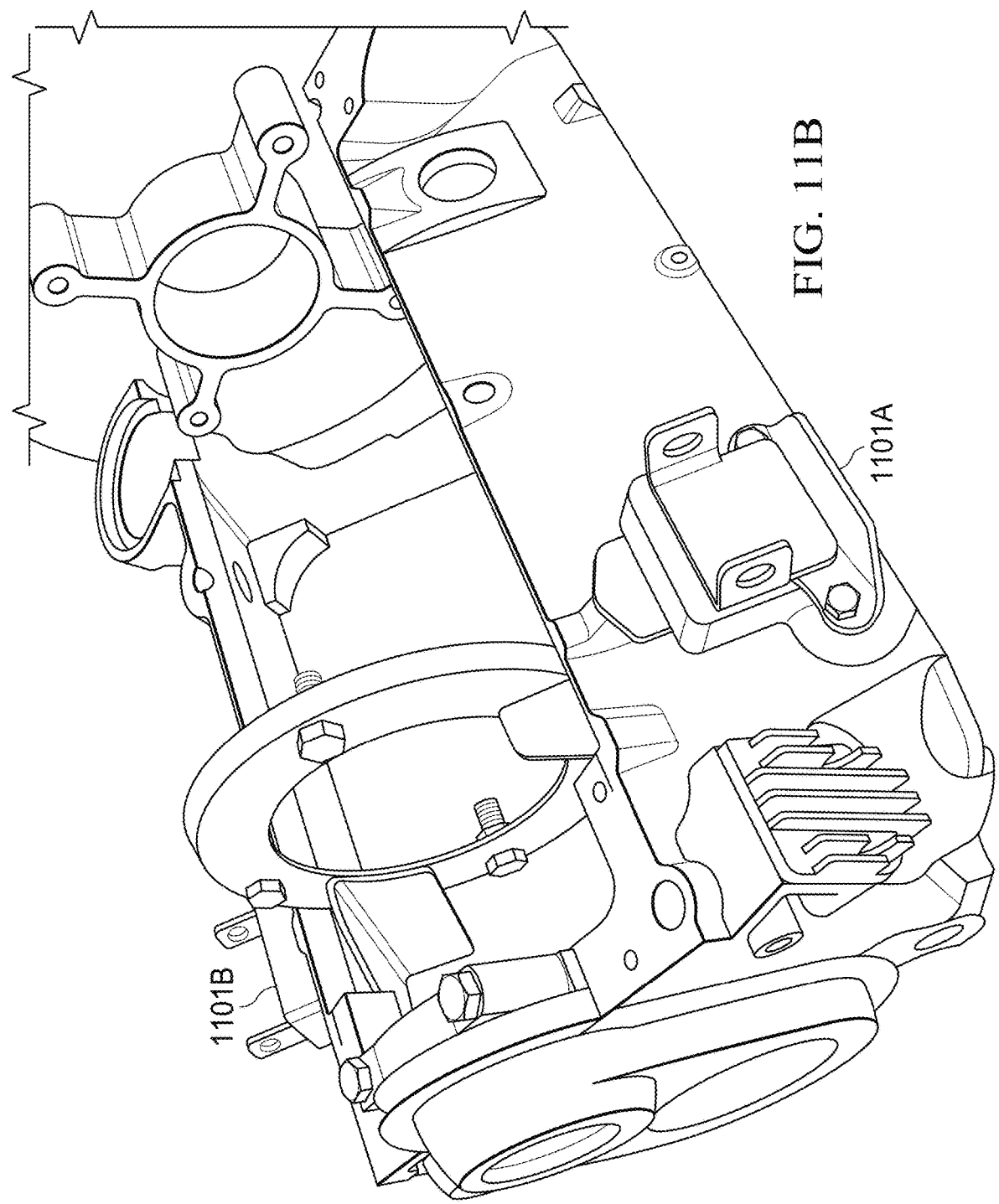

FIGS. 11A-B illustrate the front bracket assembly 1010 coupled to the motor case 300. The flat plates of the support arms 1005-1006 are positioned on the inside of the motor case 300 directly opposite of the original motor mount attachment point so that the triangle of bolt holes align with the bolt holes 302 in the motor case and original motor mounts. The opposite end of the angle bar is coupled to a round steel ring containing four bolt holes which match the threads 801A-D in the front mounting face of the electric motor 400.

The four bolts shown in FIGS. 10A-B, extend through the steel ring and attach to the front of the electric motor. The circular ring may be a different size and may have different hole configurations based on the front mounting surfaces of other types of electric motors. In one embodiment, the mounting ring is formed as an integral part of the motor case 300 to accommodate a longer electric motor of dimensions that fit within the entire crankshaft volume.

In FIGS. 11A-B a set of bolts extending out to the backside of the original motor mounts 302 to couple the front bracket 1010 to the inside of the motor case 300. The original motor mount bolt holes 302 located on either side of the motor case are drilled completely through the wall of the motor case. External brackets 1101A-B are secured with the same set of bolts that extend through the original motor mount bolt holes into the inside of the motor case 300. The bolts then extend through the original motor mounts, through the wall of the motor case and finally through the internal brackets 1101A-B. The bolts are tightened (via nuts) to couple all of these components to the motor case 300. This allows the front of the electric motor to be connected to and supported by the original motor mounts. The external brackets 1101A-B are coupled to the vehicle chassis with bolts or other attachment hardware to secure the motor case 300 to the vehicle.

In one embodiment, both the front bracket 1010 and external brackets 1101A-B are formed as integral components of the motor case 300 (e.g., as part of the mold or cast used to manufacture the motor case 300). Thus, in one embodiment, the all required mounting hardware is integrated on the motor case 300. In this embodiment, different motor cases 300 are provided for different vehicles and/or different types of electric motors 400.

Figure 12A:
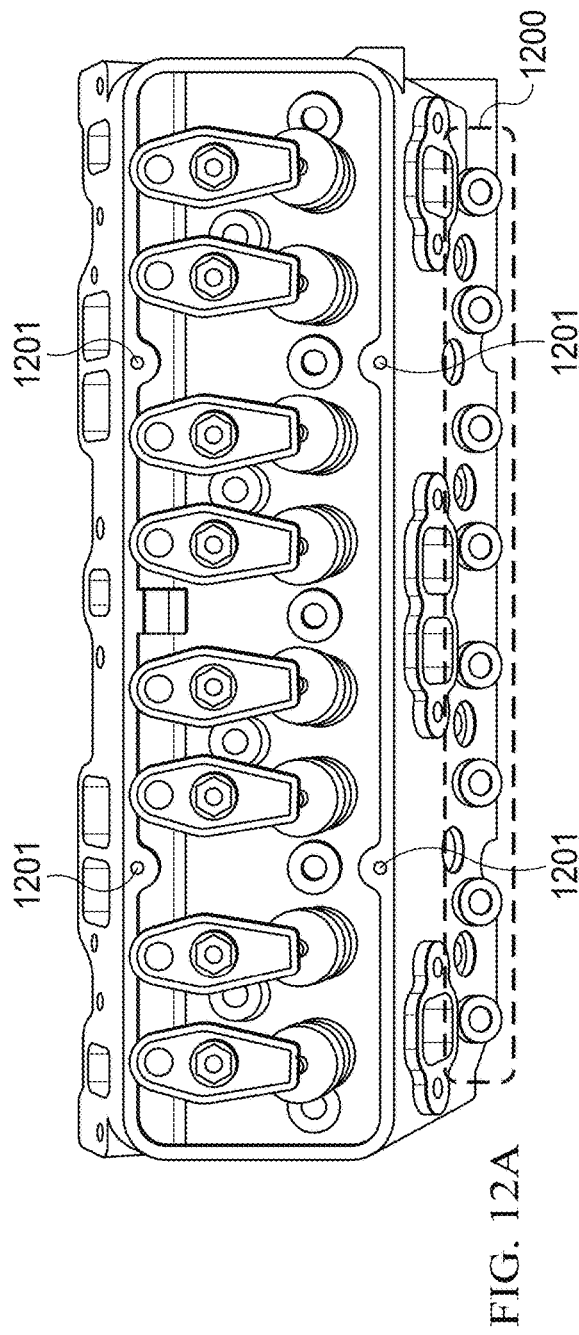
FIGS. 12A-B illustrate a typical V8 cylinder head with (FIG. 12A) and without (FIG. 12B) its internal structure.
Figure 12B:
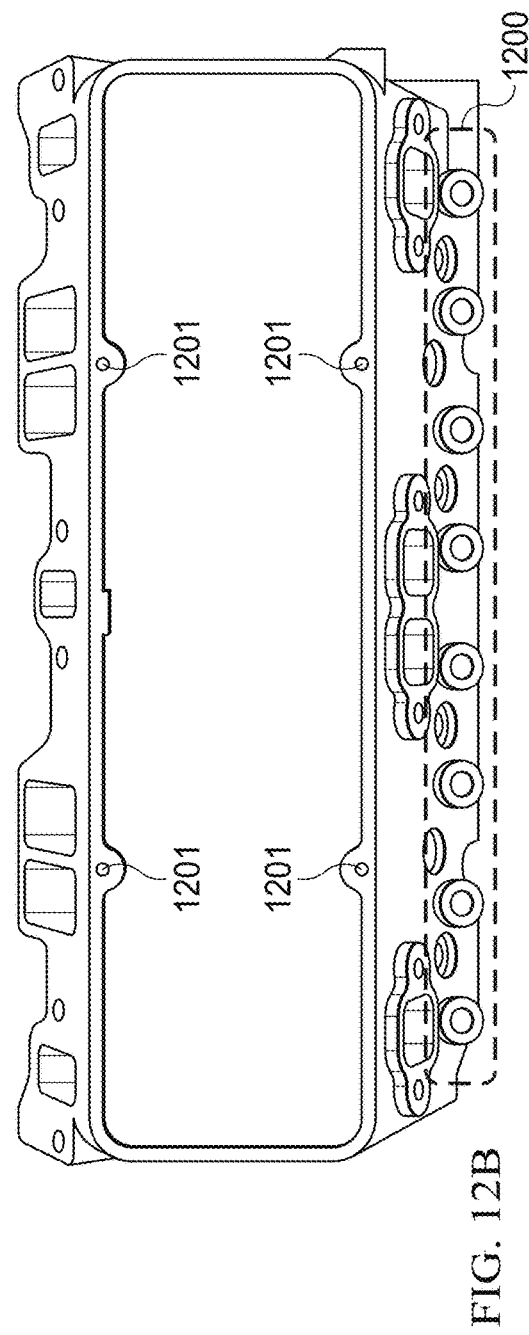

Additional space located within the motor case can be utilized to attach and conceal other components, such as the motor controller 408. For example, in one embodiment, the motor controller 408 is attached above the electric motor 400 in the space that was originally occupied by the camshaft and lifters just beneath the intake manifold. Additional space can also be found by removing the inner structure of the cylinder heads, as shown in FIGS. 12A-B. This space can also be used to house battery packs and other components required for the conversion. Removal of the inner structure of the cylinder heads also reduces the weight of the electric motor conversion significantly.

FIG. 12A illustrates a typical V8 cylinder head and FIG. 12B illustrates the same type of cylinder head after removal of the internal structure. The set of 8 holes 1200 correspond to the 8 head bolt holes 326 on the motor case 300 and are used to secure the cylinder head to the motor case 300 with 8 bolts. In one embodiment, the space created by removing the internal structure (FIG. 12B) is utilized for housing the motor controller 408 and any other related control modules, battery packs, and/or accessories. This space is easily accessible by removing the stock valve cover, which bolts to the four holes 1201 located on the top edge of the cylinder head.

The original engine block that was used to make the prototype motor case weighed 160 pounds. After removal of the inner structure from the engine block, the weight was reduced to about 50 pounds. The weight of the illustrated embodiment of the electric motor 300 is 115 pounds. Therefore, the total weight of the electric motor plus the motor case is about 165 pounds, which is almost the exact weight of the original engine block. When the weight of the pistons, rods, crankshaft, camshaft, lifters, oil and cooling fluid, is factored in, the weight of the electric motor and motor case is significantly lighter than the stock engine.

In one embodiment, the gas-to-electric conversion is undetectable. When looking in the motor compartment, the car may appear to have a fully functioning gasoline engine. Thus, nostalgia and appearance of a traditional gasoline-powered car is maintained even after converting to electrical power. With the many uncertainties and problems associated with petroleum based power, classic car and hot rod enthusiasts are looking for ways to keep their cars on the road but do not want to sacrifice the aesthetic features associated with a gas-powered engine. In this embodiment, the original appearance of the motor is completely maintained by providing the required attachment features on the motor case 300.

Figure 13A:
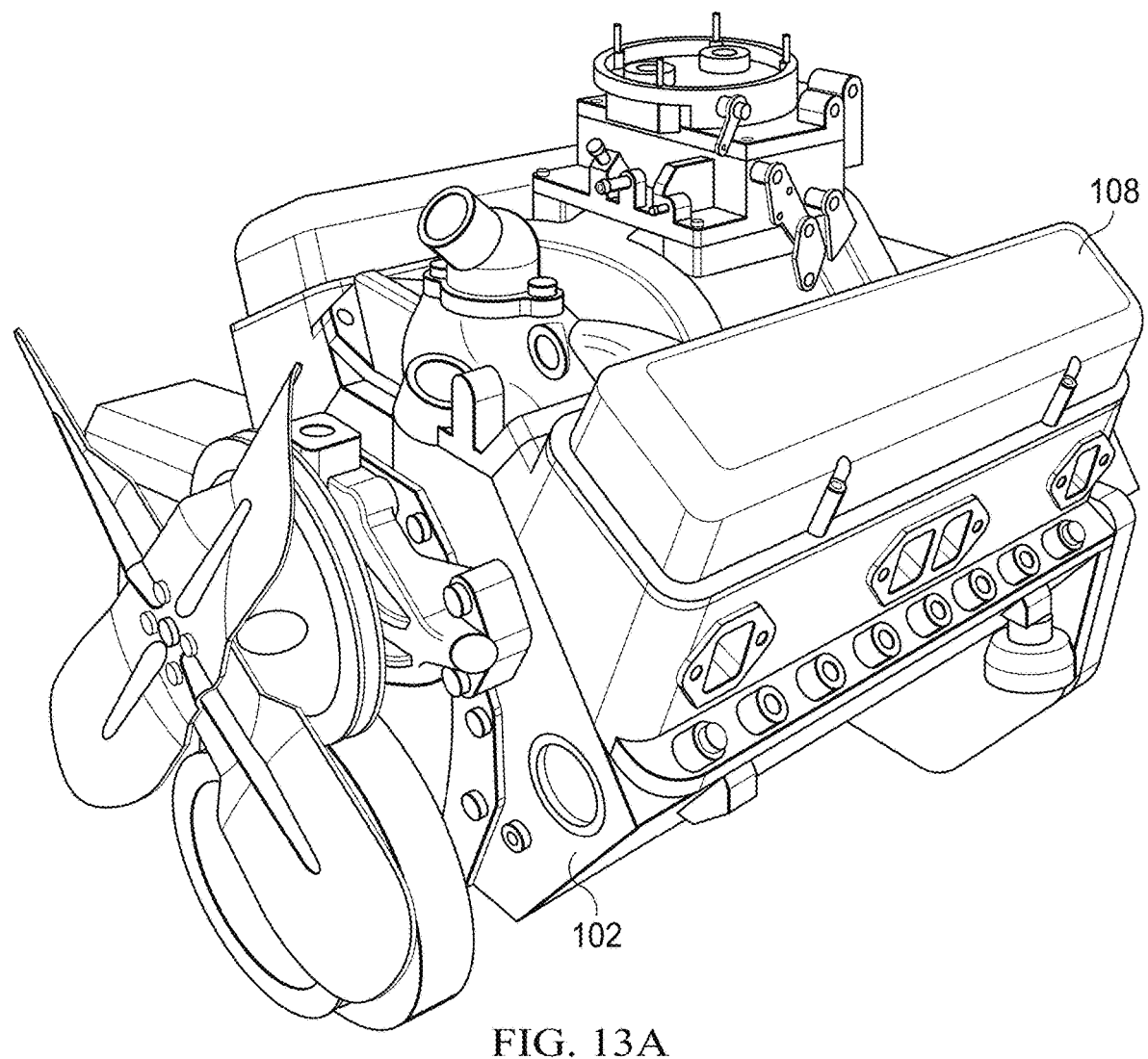
FIGS. 13A-B illustrate a Chevrolet "small block" V8 engine.
Figure 13B:
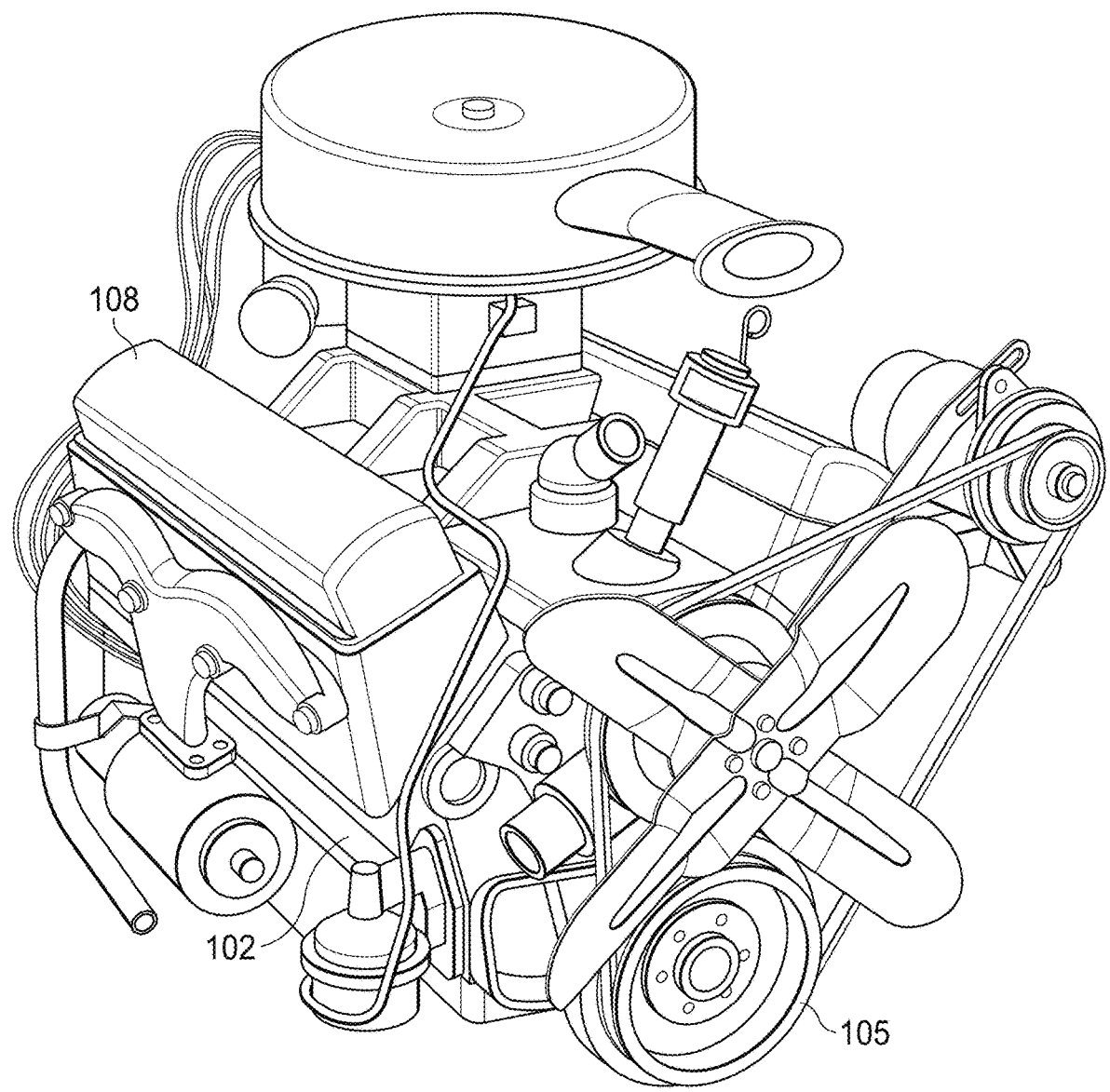

FIG. 13A illustrates an image of a Chevrolet "small block" V8 engine and FIG. 13B shows the Chevrolet small block V8 with all of the potential accessories attached. Some of the accessories shown in the drawing include the valve covers, cylinder heads, intake manifold, carburetor, air cleaner, exhaust manifold, fuel pump and starter motor. At the front of the motor, one can see the pulley and belt system that drives the water pump, fan and generator. FIG. 13A shows the electric motor prototype with many of the accessories bolted in place. The water pump, pulleys, fan, valve covers, intake manifold bolt to the motor case just as they did on the original internal combustion motor. All of the original parts can be bolted onto the motor case just as they were bolted to the motor originally. The electric motor is hidden within the motor case and is undetectable by eye.

The Small Block Chevrolet V8 motor, which used the same basic engine block design from 1954-2003, is used as an example of an implementation of the invention because of its prominence and ubiquity in the classic car and hot rodding market. More cars in the hot rod category are powered by a Chevy Small Block than any other motor by any other manufacturer. The bolt patterns found on the Small Block Chevy remained essentially unchanged during its production from 1954 to 2003.

The prominence and standardized functionality of the Small Block Chevy make it a good conversion candidate for one embodiment of the invention. There are a large number of car owners and hot-rodders who desire a viable plug-and-play electric conversion for their Small Block Chevy V8-powered cars. Other motors which may be converted in accordance with the principles described herein include the popular "Hemi" V8 from Chrysler and the Ford small block V8. During the early years of hot-rodding, the Ford "Flathead" V8 was the king of the car modification scene.

One embodiment of the motor case is a "hot rod" embodiment which provides exactly the same dimensions and outward appearance as the original crankcase, which may enable attachment of all the original parts like the manifold, cylinder heads, valve covers, and other accessories in their original positions. This will create the illusion that the electric-powered hot rod car contains a fully operational internal combustion motor.

In another embodiment, cylinder heads, such as illustrated in FIG. 12A are added to the conversion. These cylinder heads may appear exactly as the originals on the outside, but will have the inside components and support metal removed. These modified cylinder heads may appear to bolt to the motor case just like the original cylinder heads and to the original exhaust manifold 106, valve covers 108, and other accessories. The space created by hollowing out the cylinder head in this way can be utilized in various ways. For example, it can be used to conceal battery cables, which may enter via the exhaust ports, or the space can be used to house additional small battery packs or electronics used in the motor conversion. The main battery packs used in this type of conversion will typically be located at the rear of the car. The cables that connect the main battery pack to the electric motor can be routed within the original exhaust system. A hole can be drilled in the exhaust pipe that is in close proximity to the battery pack. The battery cable(s) can be fed through the hole into the exhaust system ultimately entering the motor case via the exhaust manifold and cylinder head. This will completely conceal the cable and will serve to protect the cables from damage.

Thus, embodiments of the invention include (1) a basic version which does not offer features related to aesthetics and (2) a "hot rod" version which provides additional features to hide the electric conversion.

The basic version is designed for consumers who want to convert their petroleum-powered car to electric power, and don't care if the conversion is noticeable or obvious. All of the original accessories will bolt up to the basic version motor case and electric motor just as they did on the original motor. The basic version motor case will include all of the original bolt hole patterns and mounting points as found on the original petroleum-powered engine, allowing it to bolt directly into the same position as the original motor. All of the accessory functions will be driven by rotation of the electric motor, just as they were by the petroleum-powered motor.

The "Hot Rod" version is designed for the consumer who wants the benefits of electric power, but who also wants to maintain the original look of their classic car. In one embodiment, the hot rod version includes all of the functional components of the basic version, as described herein, in addition to features which make the gas-to-electric conversion undetectable. When looking in the motor compartment, the car will appear to have a fully functioning gasoline engine.

In an embodiment, a user may prepare to remove the original gas-powered engine by removing the motor mount bolts, bell housing bolts and the bolts holding on the exhaust manifolds. The user then disconnects the fuel line and radiator hoses from the engine. Then, the user may disconnect any wires that may be connected to the engine, such as the wires connected to the choke, distributor, coil or temperature sensors. The unbolted engine may then be lifted from the engine compartment. The user may then transfer the desired engine accessories (for example, the front pulley and belt system, water pump, alternator, power steering pump, etc.) from the gasoline-powered engine to the corresponding positions on the electric motor case and enclosed electric motor using the original fasteners.

The user may then attach the motor case and electric motor, including the accessories into the motor compartment in the same position as the original motor and replace the fasteners (bolts) previously removed back into their original positions. The user then connects the battery cables to the electric motor controller connection points and route them to the battery pack and connects the wire that was removed from the distributor to the electric motor controller. This wire is typically connected to the ignition switch, which sends a positive voltage to the distributor when the ignition switch is in the "on" position. In the electric conversion, the "on" position of the ignition switch now signals the electric motor controller 408 that it is ready to power the automobile.

Significantly, no modifications to the vehicle are required to make the conversion from a gas-powered engine to an electric using the techniques described herein. Because the motor case 300, which houses and supports the electric motor 400, is held in place and fastened exactly as the original engine no changes to the motor mounts or chassis are needed. Thus, no special one-off parts are required in order to "adapt" the electric motor to the vehicle.

The original drivetrain of the vehicle is utilized and remains unchanged. The motor case 300 bolts to the original bell housing and positions the rear flange of the electric motor to connect to the original transmission just as the stock internal combustion motor did. This allows the electric motor to power the rear wheels just like the original motor.

Moreover, the original accessory functions remain fully operational. The front shaft 404 of the electric motor 400 has the same dimensions and is located in the same position as the front of the original crankshaft. This enables full function of all the pulley-driven accessories that were originally part of the vehicle. This eliminates the need to add additional pumps for things like power steering or air conditioning, which are required for most gas to electric conversions. The front pulley system also drives the alternator. Since the pulley-driven accessories remain enabled by implementation of the embodiments of the invention described herein, the original electrical system of the vehicle remains unchanged and fully functional.

Finally, the embodiments of the invention offer the exact same appearance as the original engine. All of the original parts, such as cylinder heads, the manifold, valve covers, exhaust manifolds, the carburetor, etc., bolt to the motor case 300 just as they did to the original motor allowing one to create the illusion that the car is still powered by the original internal combustion engine.

In an embodiment, the motor controller 408 used in the conversion may be programmed to maintain the electric motor running at a minimal, low level of revolutions per minute, or RPMs. This minimal level of RPM, commonly known as idle RPM for gasoline motors, will occur any time the electric motor is switched to the on position. This preprogrammed idle RPM function will enable utilization of automatic transmissions, which require a minimum speed of rotation of the crankshaft in order to operate as a transmission. This minimal rotation speed requirement applies anytime the automobile is in the on position and ready to drive, whether it is moving or sitting still. Automatic transmissions require a minimum level of fluid pressure to function properly. This fluid pressure is generated by rotation of the transmission torque converter, which is coupled to the rear flange 535 of the crankshaft via the transmission flexplate.

The entire time a gasoline engine is running, the crankshaft 506, and therefore the torque converter is rotating regardless of whether the car is moving or not. This rotation ultimately creates the pressure required to power an automatic transmission. This embodiment enables the use of automatic transmissions in electric motor conversions by programming the motor controller 408 to run the electric motor, and hence the transmission, at an idle RPM anytime the controller is turned on. In addition, when the electric motor 400 is running at idle RPM, other functions that are powered by rotation of the motor, such as power steering and air conditioning, will also be operational.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims. Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
    a motor case to be used to convert a gas-powered vehicle to an electrically-powered vehicle, the motor case comprising:
        an inner surface forming a central cavity with a volume sufficient to enclose a first type of electric motor, the volume of the central cavity to accommodate an electric motor;
        an outer surface coupled to the inner surface through a material layer comprising a material from which the motor case is fabricated;
        a first set of connection elements within the central cavity, the first set of connection elements arranged in accordance with a second set of connection elements on the first type of electric motor;
        a third set of connection elements within the central cavity, the third set of connection elements arranged in accordance with a fourth set of connection elements on the first type of electric motor,
        wherein an electric motor of the first type is to be fixedly coupled to the motor case within the cavity by pairing the first set of connection elements with the second set of connection elements and by pairing the third set of connection elements with the fourth set of connection elements;
        a set of external connection elements coupled to or formed on the outer surface of the motor case, the set of external connection elements arranged in accordance with connection points of a vehicle chassis, the set of external connection elements to be used to couple the motor case to the chassis at the connection points.

2. The apparatus of claim 1 wherein the first set of connection elements comprise a first set of bolt holes in a first rigid support structure and the third set of connection elements comprise a second set of bolt holes in a second rigid support structure.

3. The apparatus of claim 2 wherein the second set of connection elements comprise a first set of bolt threads accessible via an outer surface of the first type of electric motor and the fourth set of connection elements comprise a second set of bolt threads also accessible via the outer surface of the first type of electric motor,
    wherein to fixedly couple the first type of electric motor to the motor case, a first set of bolts are to be inserted through the first set of bolt holes and connected to the first type of electric motor via the first set of bolt threads and a second set of bolts are to be inserted through the second set of bolt holes and connected to the first type of electric motor via the second set of bolt threads.

4. The apparatus of claim 3 wherein the first rigid support structure comprises a first metal bracket coupled to the inner surface or formed on the inner surface of the motor case and the second rigid support structure comprises a second metal bracket coupled to the inner surface or formed on the inner surface of the motor case.

5. The apparatus of claim 1 wherein the motor case has a front end and a back end, the front end formed from the material to include a first opening through which an accessory drive shaft of the vehicle is to pass to be rotatably coupled to the first type of electric motor.

6. The apparatus of claim 5 wherein the back end is formed from the material to include a second opening through which an output shaft of the first type of electric motor is to pass to be rotatably coupled to a transmission of the vehicle.

7. An apparatus comprising:
    an electric motor;
        a motor case to be used to convert a gas-powered vehicle to an electrically-powered vehicle, the motor case comprising:
            an inner surface forming a central cavity with a volume sufficient to enclose the electric motor, the volume of the central cavity to accommodate an electric motor;
            an outer surface coupled to the inner surface through a material layer comprising a material from which the motor case is fabricated;
            a first plurality of connection elements within the central cavity engaged with a second plurality of connection elements on the electric motor to fixedly couple the electric motor within the cavity;
            a set of external connection elements coupled to or formed on the outer surface of the motor case, the set of external connection elements arranged in accordance with connection points of a vehicle chassis, the set of external connection elements to be used to couple the motor case to the chassis at the connection points.

8. The apparatus of claim 7 wherein the first plurality of connection elements comprise a first set of bolt holes in at least one rigid support structure and the second set of connection elements comprise bolt threads accessible via an outer surface of the electric motor.

9. The apparatus of claim 8 wherein the electric motor is fixedly coupled to the within the cavity via a plurality of bolts inserted through the first set of bolt holes and coupled to the electric motor via the bolt threads.

10. The apparatus of claim 9 wherein the at least one rigid support structure comprises at least one metal bracket coupled to the inner surface or formed on the inner surface of the motor case.

11. The apparatus of claim 9 wherein the motor case has a front end and a back end, the front end formed from the material to include a first opening through which an accessory drive shaft of the vehicle is to pass to be rotatably coupled to the first type of electric motor.

12. The apparatus of claim 11 wherein the back end is formed from the material to include a second opening through which an output shaft of the first type of electric motor is to pass to be rotatably coupled to a transmission of the vehicle.

13. The apparatus of claim 9 further comprising:
a motor controller electrically coupled to the electric motor and fixedly coupled within the central cavity of the motor case.

14. The apparatus of claim 13 wherein the motor controller is fixedly coupled to at least one bracket, which is coupled to a connection element within the central cavity of the motor case.

15. The apparatus of claim 14 wherein the motor controller includes a first set power connection conductors to which a battery is to be coupled.

16. The apparatus of claim 15 wherein the electric motor comprises input power terminals, the motor controller further comprising a second set of power connection conductors to connect to the input power terminals.

17. The apparatus of claim 7 wherein the set of external connection elements are arranged in accordance with connection points for an engine.

18. The apparatus of claim 7 wherein the motor case comprises a plurality of accessory attachment elements including attachment elements for one or more of: a power steering pump, an air conditioning pump, an alternator, and a water pump.

19. The apparatus of claim 7 wherein the motor case comprises a second plurality of external attachment elements to couple components of the gas-powered engine to the motor case including one or more of: a valve cover, the cylinder heads, an intake manifold, a carburetor, an air cleaner, an exhaust manifold, a fuel pump and a starter motor.

* * * * *